United States Patent
Searcy

(10) Patent No.: US 12,230,244 B1
(45) Date of Patent: Feb. 18, 2025

(54) GRAPHICAL USER INTERFACE FOR CUSTOMIZED STORYTELLING

(71) Applicant: Todd Searcy, Houston, TX (US)

(72) Inventor: Todd Searcy, Houston, TX (US)

( * ) Notice: Subject to any disclaimer, the term of this patent is extended or adjusted under 35 U.S.C. 154(b) by 0 days.

(21) Appl. No.: 18/398,728

(22) Filed: Dec. 28, 2023

(51) Int. Cl.
| | |
|---|---|
| *G10L 13/00* | (2006.01) |
| *G06F 3/04842* | (2022.01) |
| *G06F 3/16* | (2006.01) |
| *G06F 40/166* | (2020.01) |
| *G10L 13/02* | (2013.01) |
| *G10L 13/033* | (2013.01) |
| *G10L 13/047* | (2013.01) |
| *G10L 13/08* | (2013.01) |

(52) U.S. Cl.
CPC ........ *G10L 13/047* (2013.01); *G06F 3/04842* (2013.01); *G06F 3/165* (2013.01); *G06F 40/166* (2020.01); *G10L 13/02* (2013.01); *G10L 13/033* (2013.01); *G10L 13/08* (2013.01)

(58) Field of Classification Search
CPC ....... G10L 13/00; G10L 13/047; G10L 13/04; G10L 13/033; G10L 13/08; G10L 13/10; G10L 17/04; G10L 17/18; G10L 13/02; G06N 20/00; G06N 3/08; G06N 3/047; G06N 3/044; G06N 3/02; G06F 3/048; G06F 3/04842; G06F 3/165; G06F 40/166; G06F 3/14; G06F 16/638; G06F 16/64

See application file for complete search history.

(56) References Cited

U.S. PATENT DOCUMENTS

| | | | |
|---|---|---|---|
| 11,182,417 B1* | 11/2021 | Mishra | G06F 16/43 |
| 11,670,285 B1* | 6/2023 | Crews | G09B 5/062 |
| | | | 704/258 |
| 11,921,985 B2* | 3/2024 | Paley | G06F 16/435 |
| 2012/0098837 A1* | 4/2012 | Hulbert | A63F 13/92 |
| | | | 345/473 |
| 2016/0027431 A1* | 1/2016 | Kurzweil | G06F 3/04842 |
| | | | 715/203 |
| 2020/0019370 A1* | 1/2020 | Doggett | G10L 13/00 |
| 2022/0237368 A1* | 7/2022 | Tran | G06N 20/00 |
| 2022/0351714 A1* | 11/2022 | Yang | G10L 13/047 |
| 2024/0127708 A1* | 4/2024 | Meyrignac | G09B 5/062 |

FOREIGN PATENT DOCUMENTS

CN 116564272 A * 8/2023

* cited by examiner

*Primary Examiner* — Michael Ortiz-Sanchez
(74) *Attorney, Agent, or Firm* — Clayton, McKay & Bailey, PC

(57) ABSTRACT

Systems and methods are described herein for an application and graphical user interface ("GUI") for customized storytelling. In an example, a user can create profiles for a listener user and a reader user. The listener user profile can include information about the listener user. The reader user profile can include a voice model of the reader user's voice. The GUI can allow the user to provide a brief description of a story. The application can send the story description and listener user profile to a server that uses an artificial intelligence engine to generate a customized story for the listener user. The application can apply the reader user voice model to the story and play audio of the reader user's voice reading the story.

20 Claims, 7 Drawing Sheets

300

CREATE KID PROFILE ACCOUNT

THE INFORMATION BELOW WILL BE USED TO GENERATE BEDTIME STORIES FOR YOUR LITTLE ONE

CHILD'S NAME
[ TODD ] — 302

AGE RANGE OF CHILD
[ TODDLER ▽ ] — 304

TELL US CHARACTERISTICS OF YOUR CHILD...
[ EYE COLOR, HAIR COLOR, HEIGHT, ETC. ] — 306

DO YOU HAVE ANY PETS? TELL US ABOUT THEM...
[ ] — 308

SELECT A DEFAULT THEME FOR STORY CREATION
[ SELECT YOUR OPTION ▽ ] — 310

LIST THE NAMES OF ANY OF YOUR CHILDREN'S FRIENDS
[ ] — 312

NAME YOUR STUFFED ANIMAL
[ WYATT ] — 314

DESCRIBE YOUR STUFFED ANIMALS CHARACTERISTICS...
[ ] — 316

FIG. 3

GRAPHICAL USER INTERFACE FOR CUSTOMIZED STORYTELLING

BACKGROUND

Storytelling has long been recognized as a fundamental tool for education, entertainment, and the development of a child's imagination. Traditional methods of narrating stories to children typically involve caregivers or educators reading aloud from books or other written materials. While this approach is valuable, it often lacks the personalization and interactivity that can make storytelling a truly captivating and educational experience. Also, a child may want to hear a specific person read him or her a story, but that person may not be available.

Recent advancements in ("AI"), particularly in the fields of natural language processing ("NLP") and machine learning, have given rise to sophisticated voice models and personalization algorithms. These technologies have been applied to various domains, including virtual assistants and content recommendation systems. However, there exists a notable gap in the market for a comprehensive and inventive system that harnesses these capabilities to create tailored audio-narrated stories for children.

Existing AI-driven storytelling solutions tend to be generic and lack the ability to adapt to the individual preferences, interests, and developmental needs of each child. Moreover, the integration of voice models with customizable story content and interactive elements represents a novel and promising approach to enhancing the child's overall experience.

There is a recognized need for an inventive system and method that leverages AI-driven voice models to create personalized and interactive storytelling experiences for children. Such a system has the potential to enrich children's cognitive development, foster their love for literature, and provide caregivers and educators with a valuable tool for engaging and educating young minds.

SUMMARY

Examples described herein include systems and methods for providing customized storytelling. In an example, an application running on a user device can include a graphical user interface ("GUI") that users can interact with. The GUI can allow users to create listener and reader profiles. A listener profile can be a collection of information and data related to an individual listener user within the application. A listener user can be the targeted audience for a story. A reader profile can be a collection of information and data that describes an individual reader user within the application. The application can generate and play stories customized for a listener user, and the stories can be spoken in the voice of reader users.

The application can play audio of stories being read in one or more reader voices using voice models of reader users. The GUI can provide an interface in which the necessary data can be obtained for creating a voice model of a reader user. For example, the GUI can include a page or window where a user can input a reader user's name, relationship to listener users on an account, and other relevant information. The GUI can also display text in a window and prompt a user to read the text aloud while the application is recording. The application can send the recording to a server with a voice model AI engine that converts audio recordings into voice models using an algorithm. The server can send the reader user's voice model to the application where it can be applied to written stories to sound like the reader user is reading the story.

Listener profiles can include information about the listener user. Such information can include the user listener's name, age range, characteristics, pets, friends' names, stuffed animal's name, and so on. The application can use this information to customize a story for the listener user. For example, the GUI can include a page or window that allows a user to write a brief description of a story that the user would like created. The application can send the description, and information from the listener user profile, to a server with a story AI engine that generates stories based on provided input. The AI engine can input the story description and listener profile into an AI algorithm that outputs a story customized to the listener profile. The server can send the story to the application, where a user can interact with the GUI to modify or accept the story.

The application can apply a reader user voice model to the generated story to create an audio file that sounds like the reader user reading the story. In an example, the application can apply the voice model using TTS synthesis. The application can then play the audio file on a speaker for the listener user.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 3 is an illustration of an example GUI for providing customized storytelling.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Figure 1:
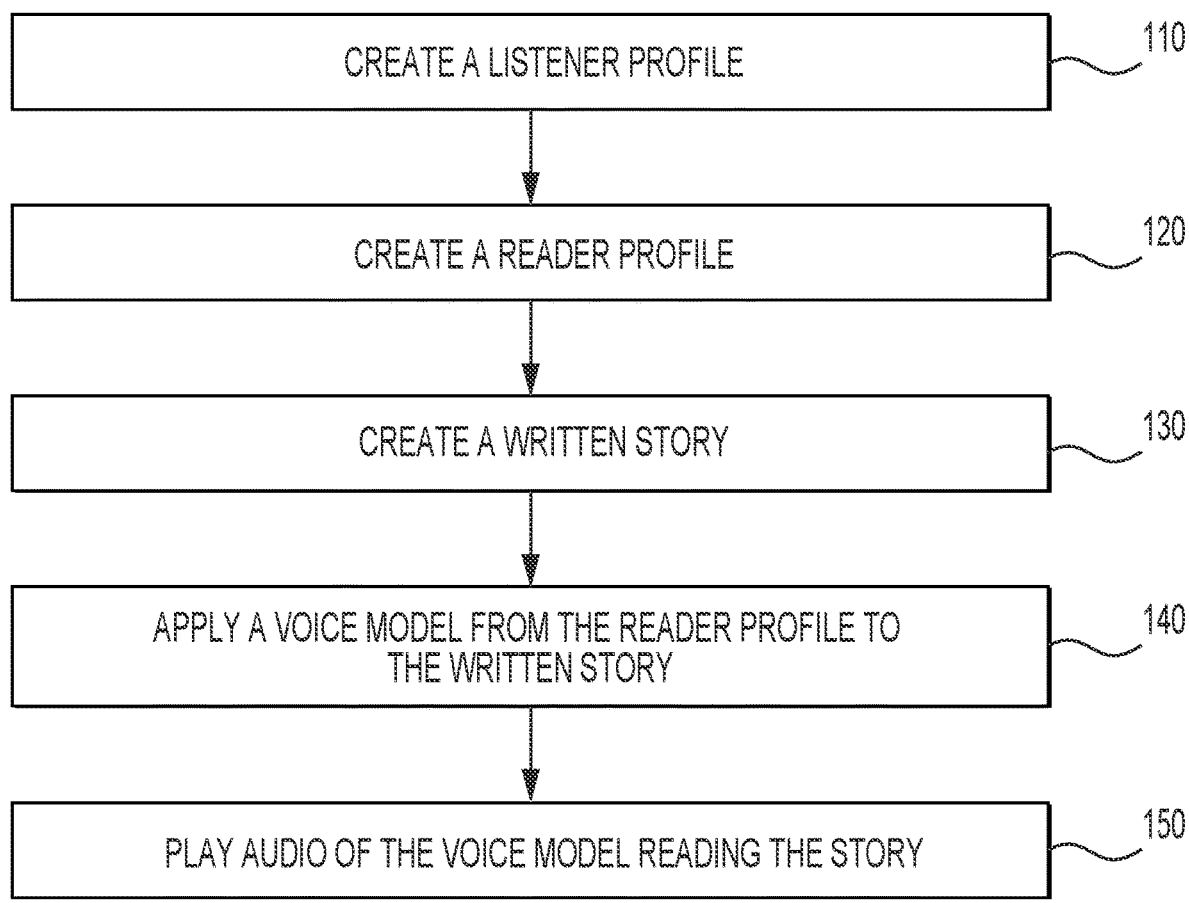
FIG. 1 is a flowchart of an example method for providing customized storytelling.

FIG. 1 is a flowchart of an example method for providing customized storytelling. At stage 110, an application can create a listener profile. The application can be a computer program, or a set of programs, designed to perform specific tasks, functions, or activities on a computing device, such as a personal computer, smartphone, tablet, or server. The application can have the ability to create a listener profile. A listener profile can be a collection of information and data related to an individual listener user within the application. A listener user can be the targeted audience for a story.

In an example, the application can include a GUI that allows a user to input information about the listener user. Such information can include the user listener's name, age range, characteristics, pets, friends' names, stuffed animal's name, and so on. This information can be used when generating a story for the listener, which is described in detail later herein. A user can add the listener profile information into the GUI and save the profile. In response, the application can create a listener profile and store the profile on the computing device in the application's file system. In one example, the application can send the listener profile to a server where the profile is retained so that it can be accessed from other computing devices.

At stage 120, the application can create a reader profile. A reader profile can be a collection of information and data that describes an individual reader user within the application. A reader profile can be used to create a voice model of the reader user's voice. For example, the application GUI can prompt a reader user to read text displayed in the GUI. The application can record the reader user while the reader user reads the text aloud. The application can send the recording to a server with an AI voice engine. The AI voice engine can be an AI engine that creates voice models based on voice recordings. A voice model can be a data file that, when applied to text input, transforms the text into spoken language using the voice of the individual upon whom the model is based.

After creating a voice model based on the reader user's voice, the server can send the voice model to the application on the computing device. The application can retain the voice model in its file system. In one example, the server can retain a copy of the voice model, which can allow a user to access the voice model from other computing devices.

At stage 130, the application can create a written story. The written story can be created based on input provided at the GUI. For example, the GUI can allow a user to select a listener profile and input a description of the story. The GUI can allow a user to select a story length, such as short, medium, or long. The application can generate a written story based on the input provided in the GUI. In one example, the application can include an engine that generates the story at the computing device. Alternatively, the application can send the information about the story to a server that includes a story AI engine that uses AI to generate a story. The server can send the written story to the application.

The listener profile and story description can be used as input for creating the written story. For example, the story AI engine can incorporate aspects of the listener user's profile into the story to personalize the story for the listener. For example, the story AI engine can create a story where the listening user is the main character and has the same or similar characteristics of the listening user, such as the listening user's name, eye color, hair color, height, pets, friends, and so on. As an example, a listening user's profile for a boy named Wyatt includes the name of Wyatt's stuffed animal horse, which is Dusty. The story AI engine can incorporate these characteristics when creating a story for Wyatt that reads something like "once upon a time, there was a little boy named Wyatt who lived in the wild west and loved riding his trusty horse, Dusty." In an example, the story AI engine can use NLP and/or other language processing techniques for extracting and interpreting information in the listener profile.

In an example, the GUI can include a window where a user can read the generated story and provide instructions for revisions. For example, such a page can include one window with text for the story and another window where the user can input desired revisions. The user can provide the revision input in natural language, which can be interpreted by the story AI engine. As an example, in the story of Wyatt described above, a user can write "please revise the story to include Wyatt's friend Michael as a sidekick." The story AI engine can revise the story to include another character with the name of Michael.

In an example, the GUI can allow a user to manually edit the story. For example, the window displaying the generated story can be editable, and a user can edit any text as desired. In one example, the GUI can allow a user to designate the story as a series. If such an option is selected, the story AI engine can generate a story with various stopping points. This can allow the story to be read in parts. For example, a parent can have a part of the story read to a child each night over a period of time.

When the user is satisfied with the story, the user can save the story. In response, the application can save the written text of the story in its file system. In one example, the application can send a copy of the story to a server where it can be accessed by other computing devices.

At stage 140, the application can apply a voice model from the reader profile to the written story. In other worse, the application can transform the text into audio in the voice of the reader user. In an example, the application can include a TTS that performs TTS synthesis on the story text. The TTS engine can analyze the input text to understand its linguistic structure, including words, punctuation, and sentence boundaries. This analysis helps determine how the text should be spoken. The TTS engine can then convert the text into a phonetic representation. This can involve breaking down the words into their individual sounds or phonemes, following language-specific rules and pronunciation guidelines. The TTS engine can add prosodic elements to the phonetic representation to make the speech sound natural. Prosody refers to the rhythm, pitch, and stress patterns in speech. This includes variations in pitch, duration of sounds, and emphasis on certain words or phrases to convey meaning and emotion. Using the phonetic and prosodic information, the TTS engine can generate speech waveforms. These waveforms represent the sound of spoken words and sentences. In this step, the TTS engine can incorporate the voice model so that the sounds of spoken words and sentence resembles the voice of the reader user. The generated speech waveforms are converted into digital audio signals that can be played through speakers or headphones.

At stage 150, the application can play audio of the voice model reading the story. The audio can be played through any device that can play audio. In one example, the application device can play the audio through speakers of the computing device. In another example, the application can play the audio through an external speaker. For example, the computing device can connect to an external speaker using a wireless connection, such as BLUETOOTH, and stream the audio to the speaker.

Figure 2:
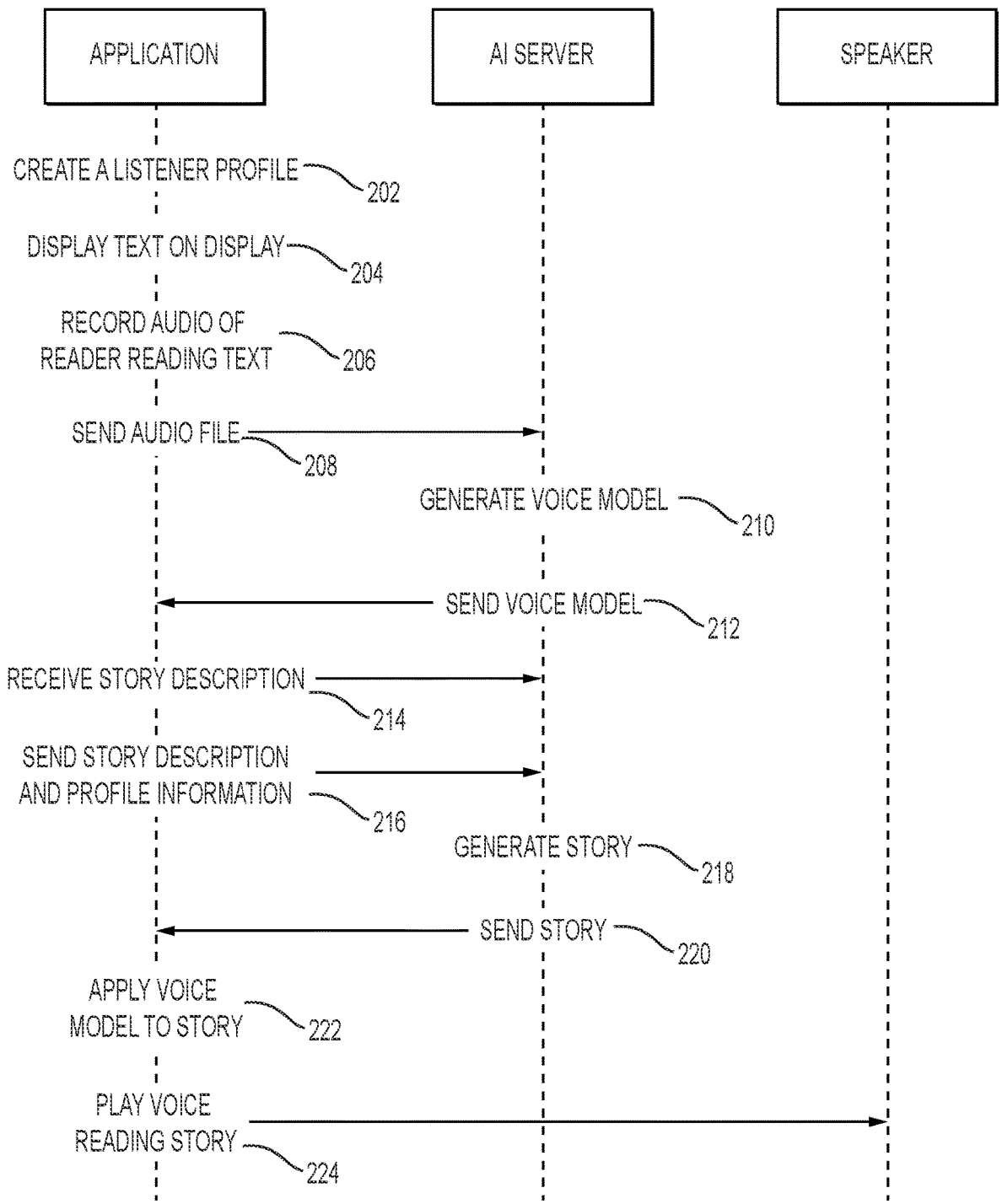
FIG. 2 is a sequence diagram of an example method for providing customized storytelling.

FIG. 2 is a sequence diagram of an example method for providing customized storytelling. At stage 202, a user can create a listener profile in an application. The application can include a GUI that allows a user to input information about the listener user. Such information can include the user listener's name, age range, characteristics, pets, friends' names, stuffed animal's name, and so on. This information can be used when generating a story for the listener. A user can add the listener profile information into the GUI and save the profile. In response, the application can create a listener profile and store the profile on the computing device in the application's file system. In one example, the application can send the listener profile to a server where the profile is retained so that it can be accessed from other computing devices. For example, a user can login to the application from another computing device and access listening profiles and stories linked to the user's account.

At stage 204, the application can display text on a display of the computing device. Displaying text on the display can be part of a process for creating a reader user profile. A reader profile can be a collection of information and data that describes an individual reader user within the application. Reader profiles can indicate a relationship to listener profiles in the application, or to a specific account that the profiles are saved under. As an example, a reader profile can indicate that the reader user is a father, mother, brother, sister, grandparent, or friend of a listener user.

At stage 206, the application can record audio of a user reading the text. For example, the application can be capable of recording a reader user's voice as the reader user reads the displayed text aloud. The application can use a microphone on the computing device to make the recording. The application can make an audio data file of the recording, such as an .mp3 or .wav file. The application can then utilize this recording to generate a personalized voice model based on the reader user's voice. This allows stories to be narrated to the listener user using the voice of the reader user.

At stage 208, the application can send the audio file to the server. The application can send the audio file using any appropriate communication protocol, such as a Hypertext Transfer Protocol Secure ("HTTPS") call or an Application Programming Interface ("API") call.

At stage 210, the server can generate a voice model. The voice model can be a data file that, when applied to text input, transforms the text into spoken language using the voice of the individual upon whom the model is based. In one example, the voice model can be generated by an AI engine running on the server. The AI engine can be trained to create voice models based on audio recordings of voices. At stage 212, the server can send the voice model to the application. The server can send the audio file using any appropriate communication protocol, such as a HTTPS call or an API call.

At stage 214, the application can receive a story description. The written story can be created based on input provided into the application's GUI. For example, the GUI can allow a user to select a listener profile and input a description of the story. The GUI can allow a user to select a story length, such as short, medium, or long. In one example, the GUI can allow a user to designate the story as a series. If such an option is selected, the story AI engine can generate a story with various stopping points. This can allow the story to be read in parts. For example, a parent can have a part of the story read to a child each night over a period of time.

At stage 216, the application can send the story description and the listener profile to the server. This server can be the same or a different server that generates the voice model. In one example, the listener profile, or a copy thereof, can be retained at the server, and the application can send an identifier that the server can use for retrieving the listener profile. The application can send the written story and listener profile using any appropriate communication protocol, such as a HTTPS call or an API call.

At stage 218, the server can generate a story. This can include inputting the story description and information from the listener profile into an AI engine that then outputs a written story. In an example, fields in the listener profile can map to inputs of an AI algorithm that the AI engine executes. Examples of such fields can include the user listener's name, age range, characteristics, pets, friends' names, stuffed animal's name, and so on. In some examples, the AI algorithm can use NLP or other language processing techniques to interpret data from the listener profile and the story description. The AI algorithm can incorporate aspects of the listener profile into the story to personalize the story for the listener user. For example, the main character can be based on the listener user, and other characters can be based on family, friends, pets, and so on.

At stage 220, the server can send the story to the application. In one example, the server can send the story as a text file, such as a .txt file or a .docx file. In another example, the story can be written text in a payload of an API call or HTTPS call.

In some examples, the application can display the written story on a page of the GUI that allows a user to provide input for written instructions for revisions. For example, such a page can include one window with text for the story and another window where the user can input desired revisions. The user can provide the revision input in natural language, which can be interpreted by the AI model. The application can send the revision input to the server, and the AI engine can input the revisions into the AI model. The AI model can interpret the input and apply the input to the story. The user can be presented with the revised story and decide whether to accept the story or provide more revisions. The user can revise the story as much as desired until the user is satisfied with the story.

At stage 222, the application can apply the voice model to the story. For example, the application can include a TTS engine that performs TTS synthesis on the story text and generate speech waveforms in the voice of the reader user. In one example, the application can generate an audio data file of the reader voice speaking the text from the written story. Examples file types of such an audio file can include an .mp3 or .wav file.

At stage 224, the application can play the voice reading the story on a speaker. In one example, the application can play story the on a speaker of the computing device. In another example, the application can play the story on an external speaker. For example, the application can stream the story to an external speaker using a BLUETOOTH or a WIFI connection. In one example, the speaker can be inserted into a toy or other device associated with the listener user. As an example, a listener user that is a child can have a stuffed animal or other toy that includes an internal speaker. The computing device can connect to the internal speaker and stream the story to the internal speaker so that the child can listen to the story from his or her stuffed animal.

In an example, the application can have the capability to retain multiple listener user profiles, multiple reader user profiles, and multiple stories. The application's GUI can allow a user to select a listener profile, reader profile, and story. Each listener profile can be linked to certain reader profiles and stories. As an example, a user, such as a parent, can select a listener user, such as the parent's child. The GUI can display associated reader profiles and stories. The user can select a reader profile and a story, and the application can apply the associated reader user's profile to the text of the selected story to play the story in the reader user's voice.

In some examples, the application can apply multiple voice models to a story. For example, one voice model can be applied as a narrator voice, and other voice models can be applied to dialogue portions of the story. This allows the listener user to hear the dialogue spoken in familiar voices, such as parents, siblings, and friends. In some examples, reader user voices can be applied to existing stories, such as e-books. In one such example, the application can parse the text and identify dialogue for characters in the story. The application can then apply one voice model for narrations and other voice models to characters' dialogue portions.

FIG. 3 is an illustration of an example listener profile page 300 of a GUI for customized storytelling. The listener profile page 300 includes various fields for information related to a listener user. For example, a user can input the listener user's name into a name field 302. The user can select an age range of the listener user into an age range field 304. The age range field 304 is a selectable drop-down menu where a user can select from multiple age ranges, such as toddler, youth, tween, teen, and adult. In one example, the age range field 304 can be a text input field where a user can enter a value corresponding to the age or the birth date of the listener user.

The user can input characteristics of the listener user into a characteristics field 306. The characteristics field 306 can be a text window where the user can provide a list of characteristics about the listener, such as eye color, hair color, height, and so on. The user can input information about pets of the listener user into a pets field 308. This can include a pet species, breed, name, color, and so on.

The listener profile page 300 can include a theme option 310 where a user can select a default theme for generated stories, such as western, sci-fi, science fantasy, and so on. The user can input the names of the listener user's friends into a friends names field 312. If the listener user has a stuffed animal that plays the story, the name of the stuffed animal can be provided in a stuffed animal name field 314. A user can input characteristics of the stuffed animal into a stuffed animal characteristics field 316.

The information can be provided for any of the fields using natural language, which can later be interpreted by an AI model using NLP or other language processing techniques. The fields described above are merely exemplary and not meant to be limiting in any way. The listener profile page 300 can include fields for any information about the listener user that may be relevant in story-generating. Any or all of the information provided in the listener profile page 300 can be used as inputs into an algorithm for story generation.

Figure 4:
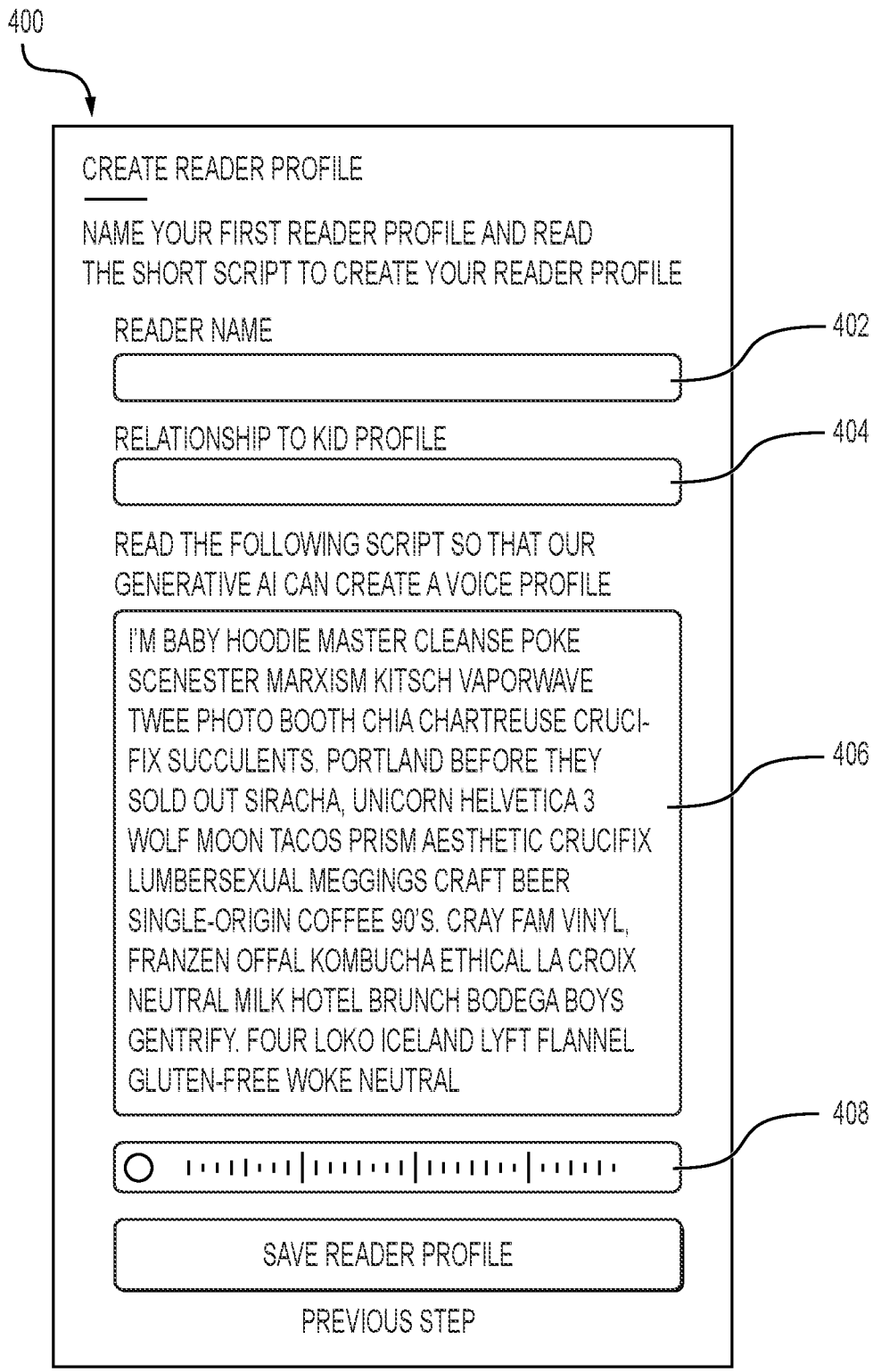
FIG. 4 is an illustration of another example GUI for providing customized storytelling.

FIG. 4 is an illustration of an example reader profile page 400 of a GUI for customized storytelling. The reader profile page 400 includes various fields for information related to a reader user. For example, the reader profile page 400 includes a reader name field 402 for providing the reader user's name. The reader profile page 400 also includes a relationship field 404 for providing the relationship of the reader user to the listener user, such as parent, grandparent, brother, sister, friend, and so on. In one example, the reader profile page 400 can include an option (not shown) for selecting one or more listener profiles and designating the reader user's relationship to each selected listener user.

The reader profile page 400 can include a script window 406 that displays text for a reader user to read aloud after selecting a record button 408. The text provided in the script window 406 can be provided by a server that hosts an AI engine for generating voice models. A user can select the record button 408 and then read the text in the script window 406 out loud. The computing device can record this can create an audio file of the recording. The application can then send the audio file to the server, where the server can generate a voice model of the reader user and send a voice model data file of the user's voice back to the computing device. The application can then save the voice model data file under the reader user's profile.

Figure 5:
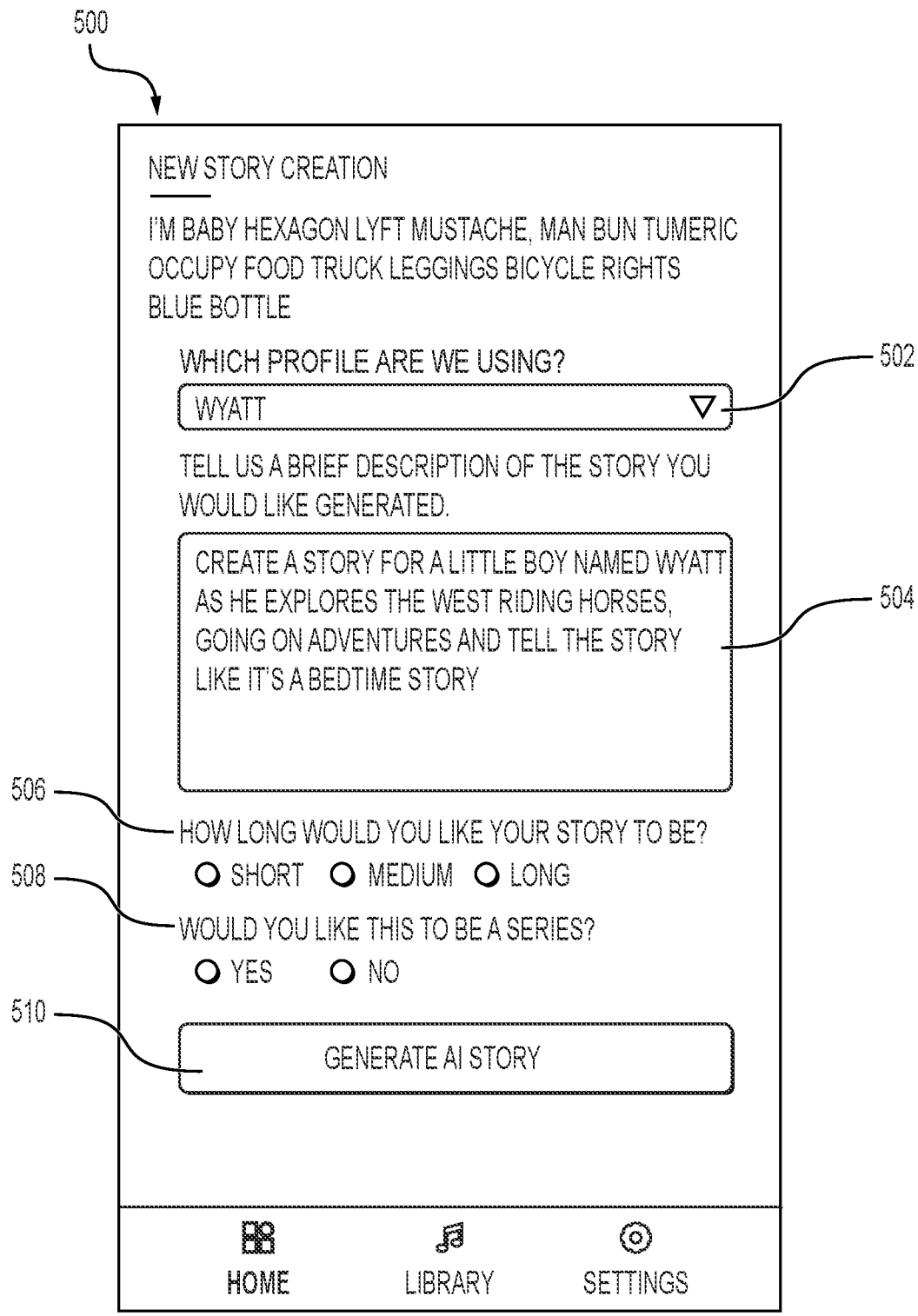
FIG. 5 is an illustration of another example GUI for providing customized storytelling.

FIG. 5 is an illustration of an example story creation window 500 of a GUI for customized storytelling. The story creation window 500 can include a listener user selection option 502 where a user can select a listener user that the story is for. This field can map to listener user profiles previously saved in the application. The story creation window 500 can include a story creation window 504 where the user can input a brief description of the story they would like generated.

The user can designate the story length using a story length option 506. The story length option 506 shows three options: short, medium, and long. The story length option 506 option can include other options for selecting story length, such as by selecting or inputting a specific length in minutes. The story creation window 500 can include a series selector 508 that allows a user to select whether the story can be part of a series. When this option is selected, the application can generate a series of connected stories or a long story that is broken up based on the length selected in the story length option 506, for example. The story creation window 500 can include a generate button 510 that, when selected, causes the application to send the information provided in the story creation window 500 to a server that generates a story based on the information provided. The generate button 510 can be any kind of GUI selection mechanism, such as a button.

Figure 6:
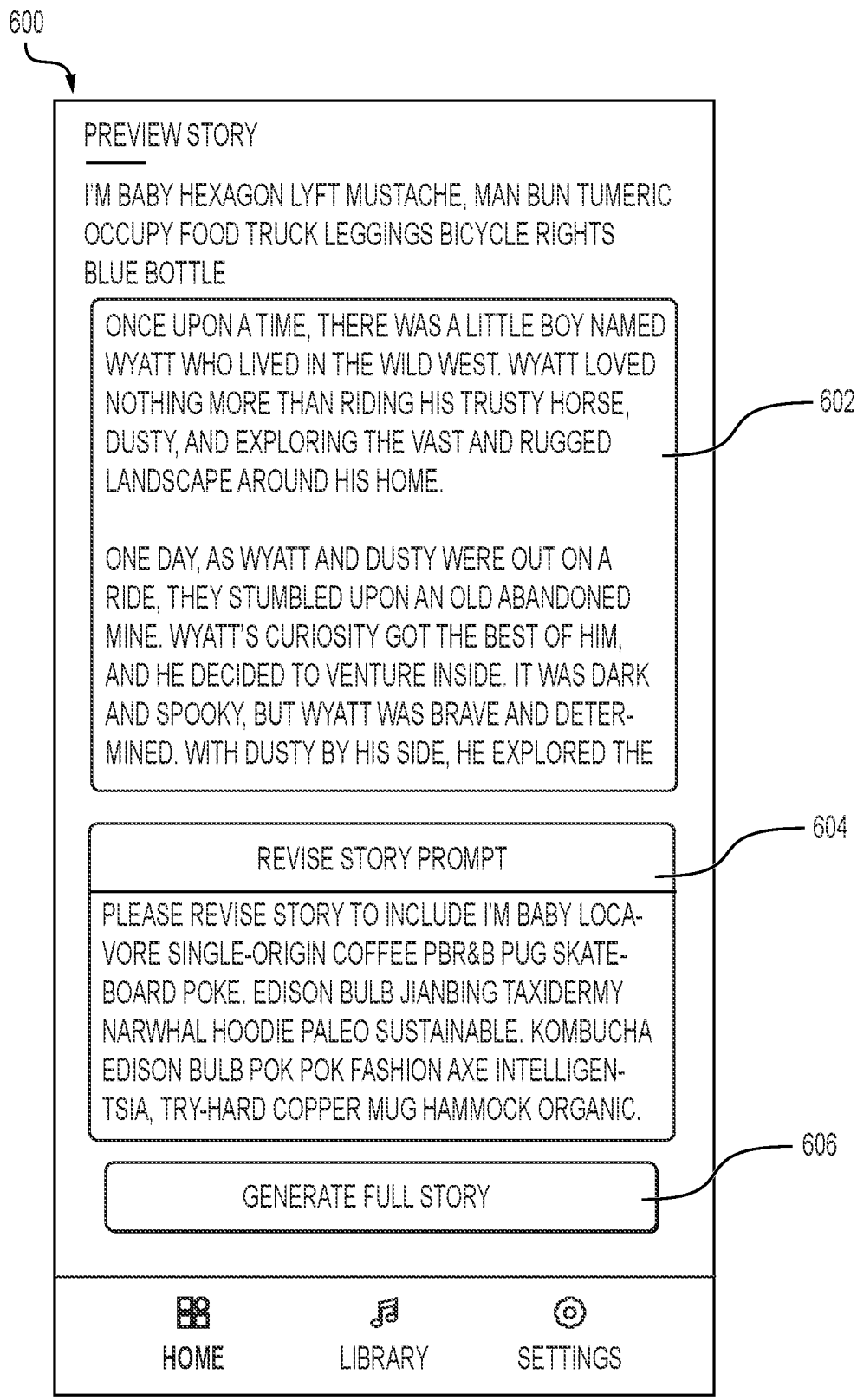
FIG. 6 is an illustration of another example GUI for providing customized storytelling.

FIG. 6 is an illustration of an example story review page 600 of a GUI for customized storytelling. The story review page 600 can include a preview window 602 that displays the text of a generated story. This can include the full story text or sample. The text in the story review page 600 can be editable so that a user can manually edit the story. The story review page 600 can include a revision window 604 where a user can provide instructions for revising the story. The user can input the desired revisions in natural language, which can be interpreted by an AI model. After providing edits and input, the user can select a story generation button 606. The story generation button 606 can be any GUI selection element, such as a button. If the user has provided edits or input, selecting the story generation button 606 can cause the application to send the user input to a server where the input is inserted into an AI model that revises the story. The server can send the revised story back to the application where it can be displayed in the story review page 600.

When the user is satisfied with the story, selecting the story generation button 606 (or, alternatively, a different button) can cause the application to save the story. In one example, the application can save the story as a text file in the application's file system on the computing device. In another example, the application can send a copy of the text file to a server where it can be retained for access by other computing device s associated with the user's account.

Figure 7:
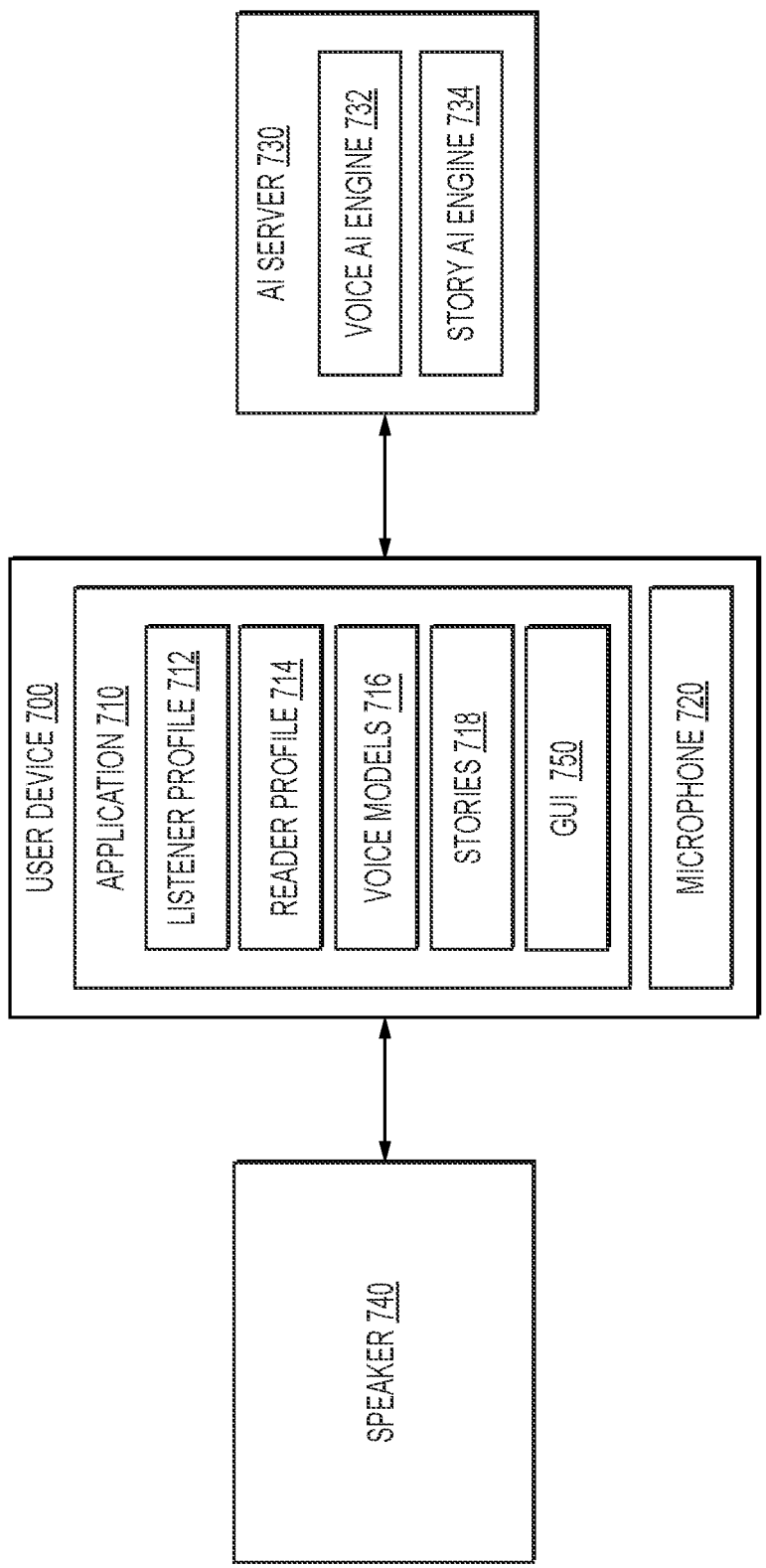
FIG. 7 is an illustration of an example system for providing customized storytelling.

FIG. 7 is an illustration of an example system for providing customized storytelling. A user device 700 can include an application 710 for customized story generation and storytelling. The user device 700 can be one or more processor-based devices, such as a personal computer, tablet, or cell phone. The application 710 can be a computer program or a set of programs designed to perform specific tasks, functions, or activities for end-users. The application 710 can include at least one listener profile 712 and at least one reader profile 714. The listener profile 712 can be a collection of information and data that describes an individual listener user within the application 710. A listener user can be the targeted audience for a story. The reader profile 714 can be a collection of information and data that describes an individual reader user within the application 710. The reader profile 710 can be used to create a voice model 716 of the reader user's voice. The application 710 can include stories 718. The stories can be text files, such as .txt or .docx files, of stories.

The application 710 can include a GUI 750. The GUI 750 can be a front-end interface for the application 710 that a user can interact with for customized storytelling. Using the GUI 750, a user can create listener profiles 712, reader profiles 714, and stories 718. For example, the GUI 750 can include a page or window where a user can input information about a listener user to create a listener profile 712. The GUI 750 can also include a page or window where a user can input information about a reader user to create a reader profile 714. When creating a reader profile 714, the reader user can read text displayed in the GUI 750, and the application 710 can use a microphone 720 of the computing device 700 to record the reader user reading the text. The microphone 720 can be a transducer or electronic device that converts sound waves, such as spoken words or musical sounds, into electrical signals. The application 710 can create an audio file of the reader user reading the text, and then send the audio file to an AI server 730 for obtaining a voice model 716 of the user's voice.

The AI server 730 can be a single server or a group of servers, including multiple servers implemented virtually across multiple computing platforms. The AI server 730 can host one or more AI engines that process data through an AI algorithm. For example, the AI server 730 can include a voice AI engine 732 that inputs voice recordings into an AI model that outputs a voice model 716 of the reader's voice. The voice AI engine 732 can be software and/or hardware components that serve as the core computational component of an artificial intelligence system that generates voice models. The AI server can also include a story AI engine 734, which can be software and/or hardware components that serve as the core computational component of an artificial intelligence system that generates stories based on input provided by a user in the GUI 750. A story description provided by the user can be used as input for the AI algorithm, and the story AI engine 734 can output a written story. The listener profile 712 can also be used as input for the story AI engine 734 so that the story can be personalized to the user. In one example, the voice AI engine 732 and story AI engine 734 can be hosted by the same AI server 730. Alternatively, the voice AI engine 732 and story AI engine 734 can be hosted on separate servers.

The user device 700 and AI server 730 can communicate with each other using any appropriate communication protocol, such as with API calls or HTTPS calls. For example, the user device 700 can send story input text and audio recording files of reader users reading text to the AI server 730 using APIs call where the story input text or the audio recording file is part of the payload. The AI server can send voice models and generated stories to the computing device using API calls where the voice models 716 and generated stories 718 are part of the payload.

The application 710 can have the ability to apply voice models 714 to stories 718 for generating an audio file of a story 718 being read in the voice of the reader user. The application 710 can communicate with a speaker 740 to play audio files. The speaker 740 can be any hardware device capable of converting electrical audio signals into audible sound waves. In one example, the speaker can be part of the user device 700. Alternatively, the speaker can be a separate device, and the user device 700 can send electrical audio signals to the speaker 740 to play. The user device 700 can send audio signals using any appropriate communication protocol, such as BLUETOOTH or WIFI.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for providing a graphical user interface ("GUI") for customized storytelling, comprising:

receiving, at the GUI, first information for a listener user profile, the first information including characteristics of a listener user associated with the listener user profile;

receiving, at an application associated with the GUI, a voice model of a reader user's voice;

receiving, at the GUI, a story description;

sending, to a first server, the story description and the listener user profile, wherein the story description and listener user profile are used as inputs into a large language model ("LLM") for generating a written story with a character with the characteristics of a listener user from the listener user profile;

receiving, from the server, a text file for the written story;

creating an audio file by applying the voice model to the written story, wherein the audio file includes synthesized audio of the reader user's voice reading the written story; and playing the audio file through a stuffed animal with an internal speaker.

2. The method of claim 1, further comprising:

receiving, at the GUI, second information for a reader user profile, the reader user profile being associated with the reader user;

displaying, in the GUI, a prompt for the reader user to read text displayed in the GUI;

recording audio of the reader user reading the text;

sending the recorded audio to a second server; and receiving, from the server, the voice model.

3. The method of claim 2, wherein the recorded audio is input, by the second server, into an artificial intelligence algorithm that outputs the voice model.

4. The method of claim 1, wherein story description and listener profile are input, by the first server, into an artificial intelligence algorithm that outputs the written story.

5. The method of claim 1, further comprising:
displaying, in the GUI, the written story;
receiving, in the GUI, revision input related to the story;
sending, to the first server, the revision input; and
receiving, from the first server, a revised written story based on the revision input, wherein the voice model is applied to the revised written story.

6. The method of claim 1, further comprising applying an additional voice model corresponding to an additional reader user to at least a portion of the written story.

7. The method of claim 1, further comprising playing the audio file through a stuffed animal with an internal speaker.

8. A non-transitory, computer-readable medium comprising instructions that, when executed by a processor, perform stages for providing a graphical user interface ("GUI") for customized storytelling, the stages comprising:
receiving, at the GUI, first information for a listener user profile, the first information including characteristics of a listener user associated with the listener user profile;
receiving, at an application associated with the GUI, a voice model of a reader user's voice;
receiving, at the GUI, a story description;
sending, to a first server, the story description and the listener user profile, wherein the story description and listener user profile are used as inputs into a large language model ("LLM") for generating a written story with a character with the characteristics of a listener user from the listener user profile;
receiving, from the server, a text file for the written story;
creating an audio file by applying the voice model to the written story, wherein the audio file includes synthesized audio of the reader user's voice reading the written story; and
playing the audio file through a stuffed animal with an internal speaker.

9. The non-transitory, computer-readable medium of claim 8, the stages further comprising:
receiving, at the GUI, second information for a reader user profile, the reader user profile being associated with the reader user;
displaying, in the GUI, a prompt for the reader user to read text displayed in the GUI;
recording audio of the reader user reading the text;
sending the recorded audio to a second server; and
receiving, from the server, the voice model.

10. The non-transitory, computer-readable medium of claim 9, wherein the recorded audio is input, by the second server, into an artificial intelligence algorithm that outputs the voice model.

11. The non-transitory, computer-readable medium of claim 8, wherein story description and listener profile are input, by the first server, into an artificial intelligence algorithm that outputs the written story.

12. The non-transitory, computer-readable medium of claim 8, the stages further comprising:
displaying, in the GUI, the written story;
receiving, in the GUI, revision input related to the story;
sending, to the first server, the revision input; and
receiving, from the first server, a revised written story based on the revision input, wherein the voice model is applied to the revised written story.

13. The non-transitory, computer-readable medium of claim 8, the stages further comprising applying an additional voice model corresponding to an additional reader user to at least a portion of the written story.

14. The non-transitory, computer-readable medium of claim 8, the stages further comprising playing the audio file through a stuffed animal with an internal speaker.

15. A system for providing a graphical user interface ("GUI") for customized storytelling, comprising:
receiving, at the GUI, first information for a listener user profile, the first information including characteristics of a listener user associated with the listener user profile;
receiving, at an application associated with the GUI, a voice model of a reader user's voice;
receiving, at the GUI, a story description;
sending, to a first server, the story description and the listener user profile, wherein the story description and listener user profile are used as inputs into a large language model ("LLM") for generating a written story with a character with the characteristics of a listener user from the listener user profile;
receiving, from the server, a text file for the written story;
creating an audio file by applying the voice model to the written story, wherein the audio file includes synthesized audio of the reader user's voice reading the written story; and
playing the audio file through a stuffed animal with an internal speaker.

16. The method of claim 1, the stages further comprising:
receiving, at the GUI, second information for a reader user profile, the reader user profile being associated with the reader user;
displaying, in the GUI, a prompt for the reader user to read text displayed in the GUI;
recording audio of the reader user reading the text;
sending the recorded audio to a second server; and
receiving, from the server, the voice model.

17. The system of claim 16, wherein the recorded audio is input, by the second server, into an artificial intelligence algorithm that outputs the voice model.

18. The system of claim 15, wherein story description and listener profile are input, by the first server, into an artificial intelligence algorithm that outputs the written story.

19. The system of claim 15, the stages further comprising:
displaying, in the GUI, the written story;
receiving, in the GUI, revision input related to the story;
sending, to the first server, the revision input; and
receiving, from the first server, a revised written story based on the revision input, wherein the voice model is applied to the revised written story.

20. The system of claim 15, the stages further comprising applying an additional voice model corresponding to an additional reader user to at least a portion of the written story.

* * * * *